April 18, 1933.                D. M. SCOTT                1,904,761
                            PRODUCTION OF ALLOYS
                             Filed Aug. 14, 1931
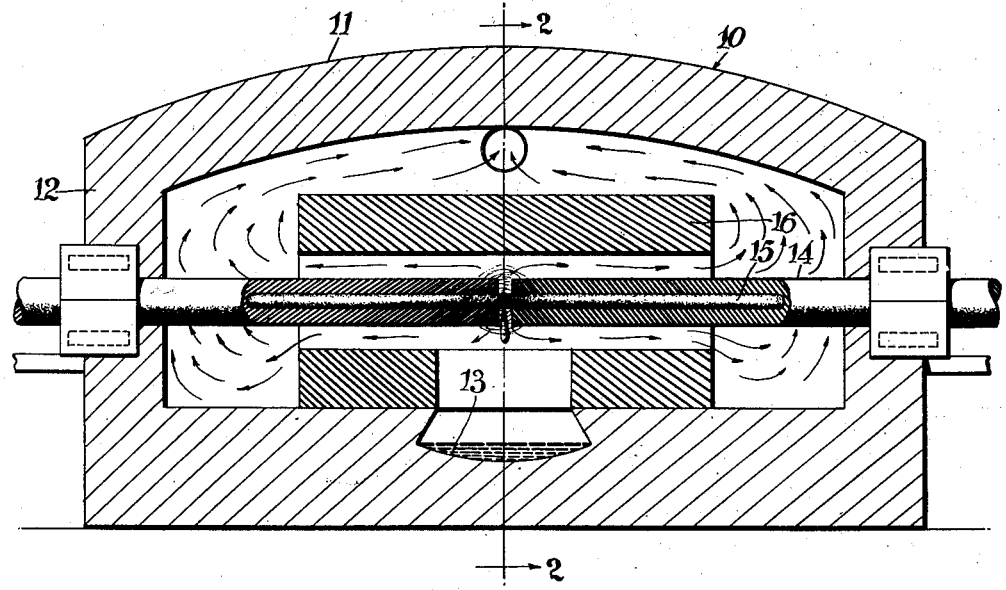
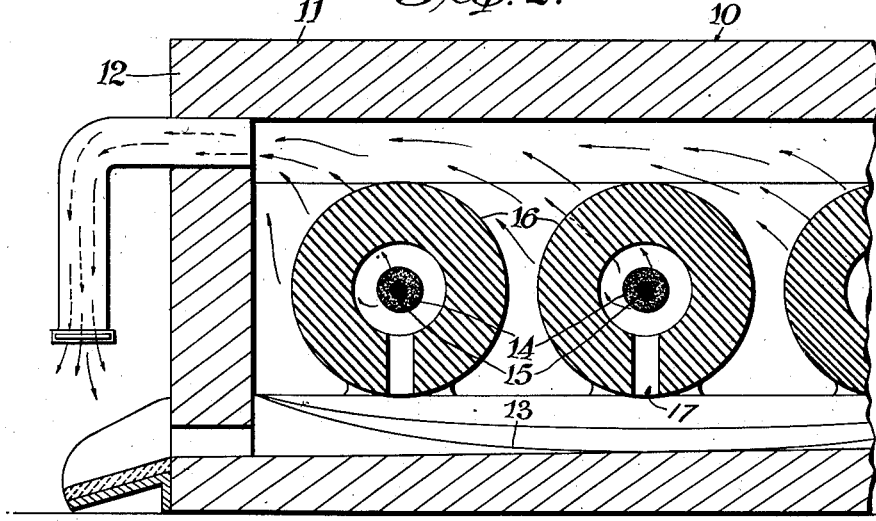
Inventor
Donald M. Scott,
By Bean, Brooks + Henry.
                    Attorney Patented Apr. 18, 1933

1,904,761

UNITED STATES PATENT OFFICE

DONALD M. SCOTT, OF BUFFALO, NEW YORK, ASSIGNOR TO BUFFALO ELECTRIC FURNACE CORPORATION, OF BUFFALO, NEW YORK

PRODUCTION OF ALLOYS

Application filed August 14, 1931. Serial No. 557,146.

This invention relates to a method of producing metallic alloys and the like by a direct reduction of the constituents thereof from their ores.

In the methods heretofore used in the production of metallic alloys and substances composed of several constituents, it has been found desirable to produce the various constituents of the end product separately in individual reduction processes and thereafter refine them severally prior to their admixture to produce the final alloy or multi-constituent material.

As may be clearly seen such processes are long and involved, entail the use of special equipment, and specialized apparatus and thereby increase the handling time and cost in each step of the reduction process.

Attempts to produce these materials directly from their ores have not met with marked success, especially in those cases wherein the various constituents of the final material demand different modes of treatment in their production and different conditions for their reduction such as temperature and nature of the surrounding atmosphere, or of the flux or slag.

It is proposed to produce alloys or multi-constituent materials by causing the reduction of the various ores and the production of their metallic constituents concomitantly and in the same furnace hearth whereby the various products are refined simultaneously and mixed to produce the predetermined end products.

It is further proposed to control the chemical reactions and conditions requisite for the production of the various materials from their ores in such manner as to obtain a maximum reaction therein and the production of the desired constituents therefrom.

I propose to produce these materials in a furnace provided with a multiplicity of feeding and reducing or reaction chambers in which the products can be obtained in an atmosphere substantially nitrogen free, and desirably use an electric furnace provided with a severalty of reducing chambers and additionally provided with a plurality of heating arcs. I propose to carry out the various metallurgical processes within the various chambers and so regulate the metallurgical conditions obtaining therein, as for instance types of reducing agents, temperature, atmosphere, fluxing agents, and slag formation, that I may reduce a plurality of ores concurrently and permit the resulting reduced constituents to mingle and intermix and thereby produce the desired alloy of predetermined composition, or other desired multi-constituent material.

In the drawing:

Fig. 1 is a vertical section of a furnace designed for practicing the invention; and Fig. 2 is a vertical section taken substantially along the line 2—2 of Fig. 1.

A preferred type of furnace is shown in the drawing in which I may carry out my process although other types of furnaces may be used which provide the suitable condition and reaction chambers as outlined herein. Thus, the furnace 10 is provided with top 11 and side walls 12 and hearth 13 made of suitable refractory material, the nature of which will vary according to the use to which it is desired to put the furnace. Thus these refractories may in some cases be acid or basic refractories of well known types of materials or may be neutral refractories or may be carbon or graphite. The furnace is desirably heated by means of electrical energy and to this end there is provided the electrodes 14 which project through the side walls of the furnace in a substantially horizontal position, although the position of the electrodes may be changed as will be noted hereinafter. These various electrodes are desirably formed with an axial passage or chamber 15 therethrough adapted to receive and permit passage therethrough of charges of predetermined composition and mixture, under predetermined heat conditions, surrounded by an atmosphere of predetermined nature, and adapted to be moved into the furnace at a predetermined rate.

To this end the ore mixture or charge may be made of finely divided material, intimately mixed and ground and fed into the furnace under the influence of desirable pressure, or may be of molded form and the mold or core fed through the axial core of the electrode. The atmosphere, temperature and reducing conditions are controlled by providing an individual muffling device 16 for each pair of electrodes which muffles may be made of any desired composition such as graphite, carbon, or of suitable refractory material, and thus efficaciously provide the heating and combustion chamber wherein the proper conditions for the reduction of any desired ore may be maintained. This procedure permits the effectuation of reduction in atmospheres substantially nitrogen free and thus eliminates whatever deleterious action this ingredient may impart to metals produced in contact therewith.

The muffle is provided with a slot or aperture 17 as a discharge point for material ejected from the electrodes whereby such material may be collected in the hearth or ladle 13 which is immediately adjacent the aperture 17 of the muffle. The various electrodes may be charged with different types of materials to be reduced and the reducing processes carried out independently of one another although concurrently and the reduced materials obtained collectively.

As an example I may prepare a silicomanganese steel in the following fashion. Through one electrode I may pass a mixture of iron ore, carbon and fluxing agent in the proper proportions and amounts to produce a low carbon iron or steel. Through another electrode I may desirably pass a mixture of an ore containing manganese, such as pyrolusite, together with a reducing agent and the necessary flux and so control the conditions as to reduce the manganese. These conditions are materially different from those which are requisite for the production of iron from iron ore, notably a somewhat lower temperature, and a different fluxing and reducing condition. Through another electrode I pass a mixed charge containing a material from which I desire to obtain silicon, or pass a mixture of iron ore and silicon containing material, together with the necessary reducing agent and so regulate the temperature and conditions as to produce a predetermined amount of ferrosilicon, thus in this electrode the reducing conditions are materially different from those in the other electrodes, namely a higher temperature is required in order to effect an appreciable reduction of the silicon from the ore.

The various reducing actions are controlled either according to the rate of reduction or amount of material charged in order to obtain a predetermined alloy mixture as the various constituents produced by the reduction of the several ores fall from the muffles and into the collecting and mixing hearth 13 below the furnace.

Where it is desired to produce steels of special composition containing particular alloying constituents, as for instance tungsten, chromium or other metals of group six of the Periodic Table I may desirably change the composition of the various charges as required and include as a reducing agent materials other than carbon, as for instance silicon, aluminum or magnesium or other special reducing agents for the purpose of producing these special alloying materials, while through the other electrode I pass ore mixtures of iron oxide or other material with the usual reducing and fluxing agents.

Under certain conditions of operation it is found desirable to produce reactions in one chamber or electrode and produce specific metals, and at the same time produce a carrying and alloying constituent therefor in another chamber. As an example I may mix an iron ore in one chamber and in another chamber an ore containing some metal of group six of the Periodic Table, as for instance vanadium, and add thereto differential reducing agents. In the specific instance cited, I add the requisite quantity of carbon to reduce the iron ore and an active metallic reducing agent of sufficient chemical affinity to liberate the other metallic ingredient from its ore. This metallic reactant is desirably one which forms an oxide capable of forming a slag and to this end such metallic elements as aluminum or silicon may be used, although certain other active metals, as for instance magnesium or calcium are found advantageous where the temperature of the reduction is not unduly elevated to a degree where the active reducing agent is distilled from the mixture. This method of operation produces iron as a base alloying element which mixes with the other alloying constituent to form substantially a one phase liquid mixture of predetermined composition. Other constituents, if necessary for the production of the desired material, are reduced in other chambers or electrodes and fall into the common hearth for final treatment.

When it is desired to produce an alloy of iron and chromium of a composition suitable for direct fabrication of commercial products, I desirably reduce an ore of chromium, such as chromite which contains iron, chromium and oxygen, by reducing agents other than carbon to eliminate the probable formation of chromium carbide by contact of the reduced metal with carbonaceous reducing agents of the ore charge.

To this end I carry out a reduction of the chrome ore in one chamber or electrode, by means of a non-carbonaceous reducing agent such as silicon, or other metal capable of reducing the ore. I desirably reduce iron ore in another chamber or electrode by means of carbon as a reducing agent. This mode of operation prevents contamination of the chromium with carbon, permits of controlled operating conditions in the reduction of the several constituents and reduces operating costs.

What is claimed is:

1. A method of producing multi-constituent alloy which comprises finely dividing and admixing solid ingredients for reducing one metal constituent of the alloy, feeding a charge of the finely divided solid ingredients through a conduit formed in an energized electrode, controlling the rate of movement of the charge through the electrode, finely dividing and mixing solid ingredients for reducing a second metallic constituent of the alloy, feeding a charge of the finely divided solid ingredients of the second metallic constituent through a second electrode, and discharging the reduced metallic ingredients from both electrodes into a common hearth.

2. A method of producing multi-constituent alloy which comprises, finely dividing and mixing solid ingredients for producing one metallic constituent of the alloy, feeding a charge of the finely divided solid ingredients through an energized hollow electrode, controlling the rate of movement of the charge through the electrode, finely dividing and mixing solid ingredients for reducing a second metallic constituent of the alloy, feeding a charge of the finely divided solid ingredients of the second metallic constituent through a second hollow electrode, maintaining the electrodes in a confined space and discharging the ingredients simultaneously therefrom upon a common mixing hearth.

3. A method of producing multi-constituent alloy composed of two primary constituents having different reducing characteristics, which comprises mixing finely divided solid material for reducing the respective constituents, feeding charges of the constituents respectively through adjacent hollow gradiently heated electrodes for reduction therein, controlling the rate of feeding of each charge according to its responsiveness to reduction by electric heat in the electrodes, and discharging the reduced constituents from the hollow electrodes into a common hearth for final mixing therein.

4. A method of producing multi-constituent alloy which comprises electrically smelting vanadium containing materials in a gradiently heated hollow electrode, smelting iron containing materials in a second hollow electrode, independently controlling the heating and movement of the materials in each electrode, and discharging the smelted materials into a common container directly from the electrodes.

DONALD M. SCOTT.